(12) United States Patent
Wilson

(10) Patent No.: US 6,921,214 B2
(45) Date of Patent: Jul. 26, 2005

(54) OPTICAL APPARATUS AND METHOD FOR COUPLING OUTPUT LIGHT FROM A LIGHT SOURCE TO AN OPTICAL WAVEGUIDE

(75) Inventor: Robert Edward Wilson, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 208 days.

(21) Appl. No.: 10/319,218

(22) Filed: Dec. 12, 2002

(65) Prior Publication Data

US 2004/0114881 A1 Jun. 17, 2004

(51) Int. Cl.[7] ............................................... G02B 6/36
(52) U.S. Cl. ......................................... 385/89; 385/93
(58) Field of Search ..................................... 385/88–94

(56) References Cited

U.S. PATENT DOCUMENTS

| | | | | |
|---|---|---|---|---|
| 4,163,953 A | * | 8/1979 | Springthorpe et al. | 372/45 |
| 4,699,453 A | | 10/1987 | Roberts | |
| 4,701,010 A | * | 10/1987 | Roberts | 385/31 |
| 5,146,516 A | | 9/1992 | Blumke | |
| 5,235,589 A | * | 8/1993 | Yokomori et al. | 369/112.27 |
| 5,600,741 A | * | 2/1997 | Hauer et al. | 385/35 |
| 5,696,862 A | * | 12/1997 | Hauer et al. | 385/88 |
| 5,701,374 A | * | 12/1997 | Makiuchi | 385/49 |
| 5,742,720 A | | 4/1998 | Kobayashi et al. | |
| 5,781,676 A | * | 7/1998 | Okada | 385/31 |
| 5,886,370 A | * | 3/1999 | Sun et al. | 257/94 |
| 6,021,238 A | * | 2/2000 | Spaeth | 385/31 |
| 6,040,934 A | * | 3/2000 | Ogusu et al. | 398/139 |
| 6,115,521 A | * | 9/2000 | Tran et al. | 385/52 |
| 6,328,484 B1 | * | 12/2001 | Uebbing | 385/93 |
| 6,385,374 B2 | * | 5/2002 | Kropp | 385/47 |
| 6,422,766 B1 | | 7/2002 | Althaus et al. | |
| 6,454,470 B1 | | 9/2002 | Dwarkin | |
| 6,491,447 B2 | * | 12/2002 | Aihara | 385/92 |
| 6,516,111 B1 | * | 2/2003 | Jurbergs et al. | 385/18 |
| 6,668,113 B2 | * | 12/2003 | Togami et al. | 385/33 |
| 6,752,379 B1 | * | 6/2004 | Wall | 254/7 R |
| 2001/0004413 A1 | * | 6/2001 | Aihara | 385/88 |
| 2002/0071639 A1 | * | 6/2002 | Kropp | 385/88 |
| 2002/0176671 A1 | * | 11/2002 | Tourne | 385/88 |
| 2004/0017977 A1 | * | 1/2004 | Lam et al. | 385/49 |
| 2004/0042705 A1 | * | 3/2004 | Uchida et al. | 385/14 |
| 2004/0234210 A1 | * | 11/2004 | Nagasaka et al. | 385/88 |

FOREIGN PATENT DOCUMENTS

| | | |
|---|---|---|
| EP | 0613032 | 2/1994 |
| EP | 0744798 | 11/1996 |
| JP | 60124983 | 7/1985 |
| WO | WO02/056077 | 7/2002 |
| WO | WO03/077001 | 3/2003 |

\* cited by examiner

Primary Examiner—Ellen E. Kim

(57) ABSTRACT

An optical apparatus and method for coupling output light from a light source to an optical waveguide utilizes an optical turning element with integrated lenses to reduce the difficulty of precisely aligning multiple components of the optical apparatus.

25 Claims, 4 Drawing Sheets

OPTICAL APPARATUS AND METHOD FOR COUPLING OUTPUT LIGHT FROM A LIGHT SOURCE TO AN OPTICAL WAVEGUIDE

FIELD OF THE INVENTION

The invention relates generally to fiber optics, and more particularly to an optical apparatus for coupling output light from a light source to an optical waveguide.

BACKGROUND OF THE INVENTION

Semiconductor lasers are commonly used as optical signal generators in fiber optic communications systems. The optical signals generated by a semiconductor laser are transmitted through an optical waveguide, such as an optical fiber, to their destination. An important aspect of an optoelectronic component employing a semiconductor laser is the coupling of the output light from the laser to an optical fiber. Typically, a semiconductor laser is packaged with a lens in an optical subassembly (OSA) to focus the output light from the laser into an exposed end of an optical fiber to ensure good coupling efficiency. Thus, the semiconductor laser and the lens must be properly aligned so that the output light from the laser is effectively transmitted to the optical fiber.

There are two distinct types of semiconductor lasers used in fiber optic communications systems. The first type of semiconductor lasers includes edge-emitting lasers, such as Fabry-Perot (FP), Distributed Feedback (DFB) lasers and Distributed Bragg Reflector (DBR) lasers. The other type of semiconductor lasers includes vertical-emitting lasers, such as Vertical Cavity Surface Emitting Lasers (VCSELs). The edge-emitting and vertical-emitting lasers are usually packaged so that the output light from an edge-emitting laser or a vertical-emitting laser propagates along a straight optical path from the laser through a lens and to the fiber (or optical waveguide). Thus, OSAs with vertical-emitting lasers cannot be readily interchanged with OSAs with edge-emitting lasers since the propagating direction of the output light depends on the type of lasers employed in the OSAs. However, OSAs with edge-emitting lasers have been developed that can turn the output light from the original horizontal direction to the vertical direction, which allows these OSAs to be interchanged with OSAs with vertical-emitting lasers.

A conventional OSA with an edge-emitting laser that can transmit the output light in the vertical direction includes a 45-degree mirror structure and a lens. The edge-emitting laser and the mirror are mounted on a substrate such that the output light from the laser is reflected off the reflective surface of the mirror structure. Thus, the output light from the laser is redirected from the original horizontal direction to the vertical direction. The lens is attached to the mirror structure to focus the redirected output light propagating in the direction of an optical fiber.

A concern with conventional OSAs with edge-emitting lasers that can vertically transmit output light is that precise alignment of various elements of the OSAs, such as the laser, the mirror structure and the lens, is difficult to achieve for proper coupling of the laser to an optical fiber.

In view of this concern, there is a need for an OSA with an edge-emitting laser that reduces the difficulty of precisely aligning the various components of the OSA.

SUMMARY OF THE INVENTION

An optical apparatus and method for coupling output light from a light source to an optical waveguide utilizes an optical turning element with integrated lenses to reduce the difficulty of precisely aligning multiple components of the optical apparatus. The optical turning element includes a reflecting surface to reflect output lights from an array of light sources, such as an array of edge-emitting lasers, so that the output lights can be redirected from an original direction to a modified direction. The optical turning element further includes a receiving surface that may refract the output lights from the array of light sources for redirection. The receiving and reflecting surfaces may be formed using a common silicon fabrication process.

An apparatus in accordance with an embodiment of the invention includes a substrate, an edge-emitting light source and an optical element. The edge-emitting light source is positioned on the substrate, along with the optical element. The edge-emitting light source is configured to generate an output light along an original direction. The optical element includes a first surface to receive the output light from the edge-emitting light source such that the output light is transmitted into the optical element. The optical element further includes a second surface to internally reflect the output light to redirect the output light from the original direction to a modified direction. The optical element further includes a third surface with a lens formed on the third surface to optically manipulate the output light as the output light is transmitted through the third surface.

A method for coupling output light from a light source to a waveguide includes the steps of transmitting the output light from the light source propagating along an original direction into an optical element, redirecting the output light from the original direction to a modified direction within the optical element, and emitting the output light propagating along the modified direction out of the optical element toward the waveguide. The step of emitting the output light includes optically manipulating the output light into the waveguide.

Other aspects and advantages of the present invention will become apparent from the following detailed description, taken in conjunction with the accompanying drawings, illustrated by way of example of the principles of the invention.

DETAILED DESCRIPTION

Figure 1:
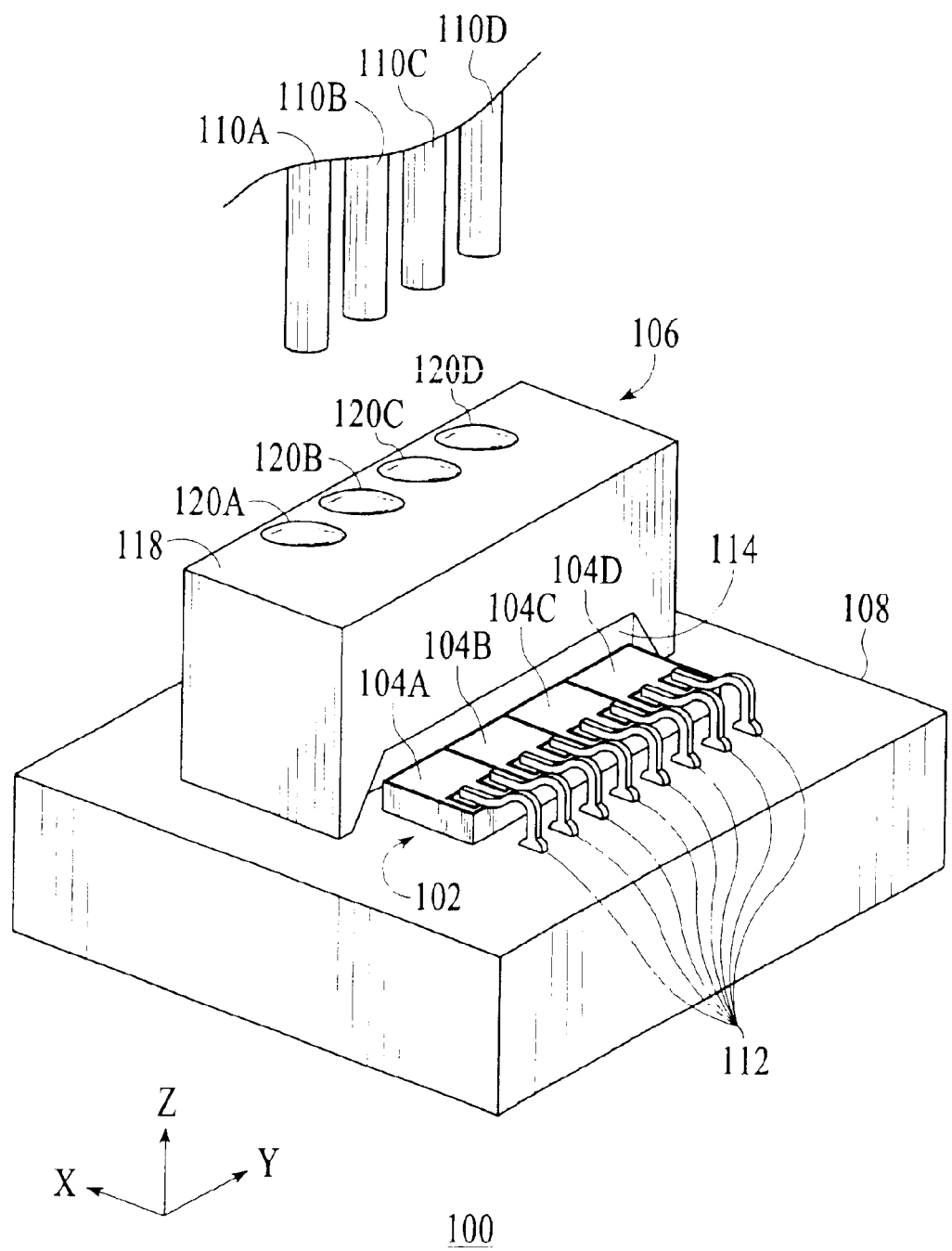
FIG. 1 is a first perspective view of an optical subassembly (OSA) in accordance with exemplary embodiment of the present invention.
Figure 2:
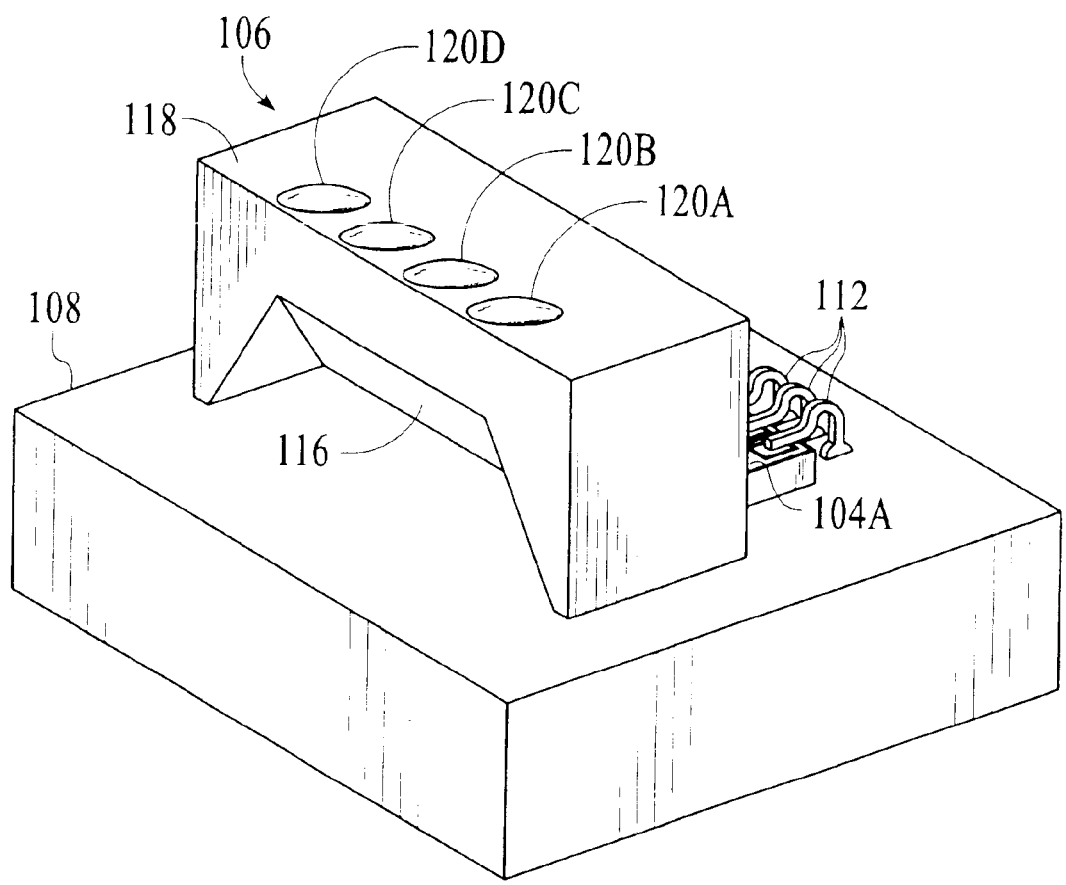
FIG. 2 is a second perspective view of the OSA of FIG. 1.

With reference to FIGS. 1 and 2, an optical subassembly (OSA) 100 in accordance with an exemplary embodiment of the invention is shown. The OSA 100 includes an array 102 of edge-emitting lasers 104A, 104B, 104C and 104D and an optical turning element 106, which are attached to a submount substrate 108. The optical turning element 106 is used to redirect output lights from the edge-emitting lasers from a lateral direction to a vertical direction toward optical waveguides, which may be optical fibers 110A, 110B, 110C and 110D, as shown in FIG. 1. The lateral direction is defined herein as the direction parallel to the upper surface of the sub-mount substrate, e.g., the X direction shown in FIG. 1. The vertical direction is defined herein as the direction perpendicular to the lateral direction, i.e., the Z direction shown in FIG. 1. Thus, the OSA 100 is compatible to a conventional OSA with vertical-emitting lasers, and consequently, can be interchanged with such conventional OSA.

The array 102 of edge-emitting lasers 104A, 104B, 104C and 104D of the OSA 100 is configured to generate modulated output lights, which are transmitted through the optical fibers 110A, 110B, 110C and 110D as optical signals. The array of edge-emitting lasers is illustrated in FIG. 1 as including four edge-emitting lasers. Thus, the illustrated array of edge-emitting lasers is a four-channel laser array. However, the array of edge-emitting lasers may include fewer or more edge-emitting lasers. As an example, the laser array may include twelve edge-emitting lasers. In the exemplary embodiment, the edge-emitting lasers included in the array are Fabry-Perot lasers. However, the edge-emitting lasers may be other type of edge-emitting lasers, such as Distributed Bragg Reflector (DBR) lasers. The edge-emitting lasers are driven by circuitry (not shown), which is connected to the lasers through electrical connections 112. The array of edge-emitting lasers is attached to the sub-mount 108, which may be composed of silicon, adjacent to the optical turning element 106. In other embodiments, the OSA 100 may include a single edge-emitting laser instead of the array of edge-emitting lasers.

The optical turning element 106 of the OSA 100 is configured to redirect the output lights of the edge-emitting lasers 104A, 104B, 104C and 104D from the lateral direction, e.g., the X direction, to the vertical direction, i.e., the Z direction, by reflecting and/or refracting the output lights. Thus, the optical turning element can turn the optical axis of the output lights from the edge-emitting lasers by approximately ninety degrees. In addition, the optical turning element is configured to focus the output light from each of the edge-emitting lasers so that the output lights from the edge-emitting lasers are properly transmitted to the respective optical fibers 110A, 110B, 110C and 110D. The optical turning element includes a receiving surface 114 (shown in FIG. 1), a reflecting surface 116 (shown in FIG. 2) and a focusing surface 118 (shown in both FIGS. 1 and 2). The receiving surface is the surface where the output lights from the edge-emitting lasers are transmitted into the optical turning element. As described below, the receiving surface may be angled to refract the output lights as the output lights are transmitted into the optical turning element. The reflecting surface functions as a mirror to reflect the output lights toward the optical fibers. The focusing surface is the surface from where the reflected output lights are emitted from the optical turning element.

Figure 3:
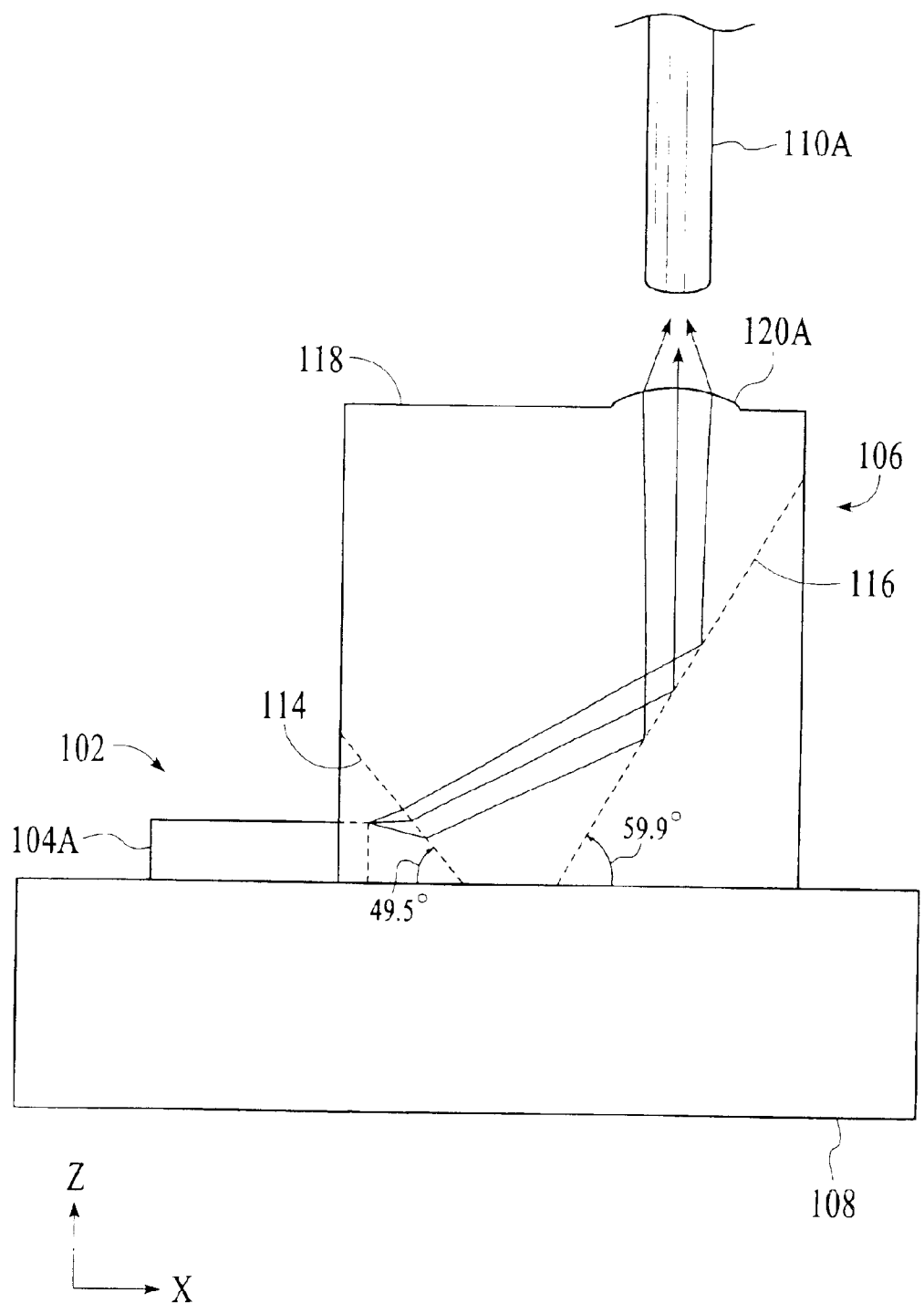
FIG. 3 is a cross-sectional view of the OSA of FIG. 1.

As illustrated in FIG. 3, the receiving and reflecting surfaces 114 and 116 of the optical turning element 106 are angled with respect to the X axis. FIG. 3 is a cross-sectional view of the OSA 100 across the edge-emitting laser 104A, the optical turning element 106, the sub-mount 108 and the optical fiber 110A. The receiving and reflecting surfaces are angled such that each output light from the edge-emitting lasers 104A, 104B, 104C and 104D is refracted by the receiving surface and then reflected off the reflecting surface toward the respective optical fiber 110A, 110B, 110C or 110D, as illustrated in FIG. 3. The optical turning element 106 is attached to the sub-mount 108 such that the receiving surface of the optical turning element is in close proximity to the light-emitting edges of the edge-emitting lasers 104A, 104B, 104C and 104D.

The focusing surface 118 of the optical turning element 106 is substantially parallel to the X axis. As stated above, the focusing surface is the surface from where the reflected output lights are emitted out of the element toward the optical fibers. The focusing surface includes lenses 120A, 120B, 120C and 120D, which are formed on the focusing surface. Thus, the lenses are structurally integrated into the optical turning element. These lenses of the optical turning element separately manipulate the output lights from the corresponding edge-emitting lasers 104A, 104B, 104C and 104D, which have been reflected by the reflecting surface 116, into exposed ends of the respective optical fibers 110A, 110B, 110C and 110D. The surfaces of the lenses could be fabricated as etched, or cast refractive or diffractive surfaces. The lenses may be designed so that the is output lights emitted from the optical turning element propagate in a convergent, parallel or divergent manner. The lenses may also be designed so that one or more of the output lights propagate off-axis from the lenses. In the exemplary embodiment, the pitch of the lenses is 0.25 mm. However, the pitch of the lenses may be shorter or longer. As illustrated in FIGS. 1 and 2, the optical turning element includes four lenses, which correspond to the four edge-emitting lasers of the array 102. Thus, the number of lenses included in the optical turning element depends on the number of edge-emitting lasers being used in the OSA 100. Since the lenses are formed on the optical turning element along with the refractive and reflective surfaces, i.e., the receiving and reflecting surfaces 114 and 116, the OSA 100 only requires alignment of two components (the laser array 102 and the optical turning element 106) rather than three components (a laser, a mirror structure and a lens), as is the case in some conventional OSAs with edge-emitting lasers that can vertically emit output light.

In the exemplary embodiment, the optical turning element 106 is made of silicon. However, the optical turning element can be made of other comparable transparent materials, such as injection-molded plastic, pressed glass, sapphire, III–V material, or II–VI material. In addition to being made of silicon, the optical turning element is fabricated such that the receiving and reflecting surfaces 114 and 116 are angled at approximately 49.5 and 59.9 degrees from the X axis, respectively, as illustrated in FIG. 3. Thus, the receiving surface and the upper surface of the sub-mount 108 create a 49.5 degree angle. Similarly, the reflecting surface and the upper surface of the sub-mount create a 59.9 degree angle. In addition, the receiving surface and the reflecting surface create a 70.6 degree angle. The optical turning element with such receiving and reflecting surfaces can be fabricated by wet-etching a silicon wafer, during which etchant is selectively applied to the surface of the silicon wafer to remove portions of the wafer to form the angled receiving and reflecting surfaces. Due to the crystal alignment of the silicon wafer, the receiving and reflecting surfaces that create a 70.6 degree angle can be formed by anisotropically etching the silicon wafer. Therefore, in the exemplary embodiment, the configuration of the optical turning element allows the use of common silicon fabrication processing, i.e., a wet-etching process, to produce precise crystallographic surfaces, which serve as the receiving and reflecting surfaces of the optical turning element. Although the receiving and reflecting surfaces are angled at approximately 49.5 and 59.9 degrees from the X axis, respectively, in the exemplary embodiment, these surfaces can be orientated at different angles to refract and reflect the received lights toward the lenses 120A, 120B, 120C and 120D. However, the receiving and reflecting surfaces should form an angle that is approximately 70.6 degrees in order to take advantage of silicon wet-etching process.

In operation, electrical control signals are selectively applied to the edge-emitting lasers 104A, 104B, 104C and 104D of the array 102 via the electrical connections 112 to activate one or more lasers. Each activated edge-emitting laser then emits output light from its light-emitting edge toward the receiving surface 114 of the optical turning element 106 along the lateral direction. The output light travels through the receiving surface into the optical turning element toward the reflecting surface 116 of the element. In the exemplary embodiment, the output light is refracted by the receiving surface due to the angle of the receiving surface. The output light then reflects off the reflecting surface such that the optical axis of the output light is redirected from the original lateral direction to the vertical direction toward the focusing surface 118 of the element. Thus, the output lights is turned by approximately ninety degrees by the receiving and reflecting surfaces of the optical turning element.

The reflected output light then travels through one of the lenses 120A, 120B, 120C and 120D on the focusing surface 118 of the optical turning element 106, which corresponds to the edge-emitting laser 104A, 104B, 104C or 104D from where the output light originated. Thus, the output light is emitted out of the optical turning element through the lens toward one of the optical fibers 110A, 110B, 110C and 110D that is aligned with the lens and the corresponding edge-emitting laser. The lens focuses the output light so that the light is efficiently transmitted into the optical fiber. In this fashion, the output light from each activated edge-emitting laser is transmitted into the optical fiber that is aligned with that edge-emitting laser.

The optical turning element 106 of the OSA 100 was analyzed using ray-trace analysis, which indicated that the optical turning element could be very efficient with proper anti-reflection coating. The ray-trace analysis indicated an overall optical efficiency of over ninety-five percent from the edge-emitting lasers 104A, 104B, 104C or 104D up to the optical fibers 110A, 110B, 110C and 110D. The optical efficiency does not include losses into the optical fibers or losses due to diffractive inefficiencies.

Figure 4:
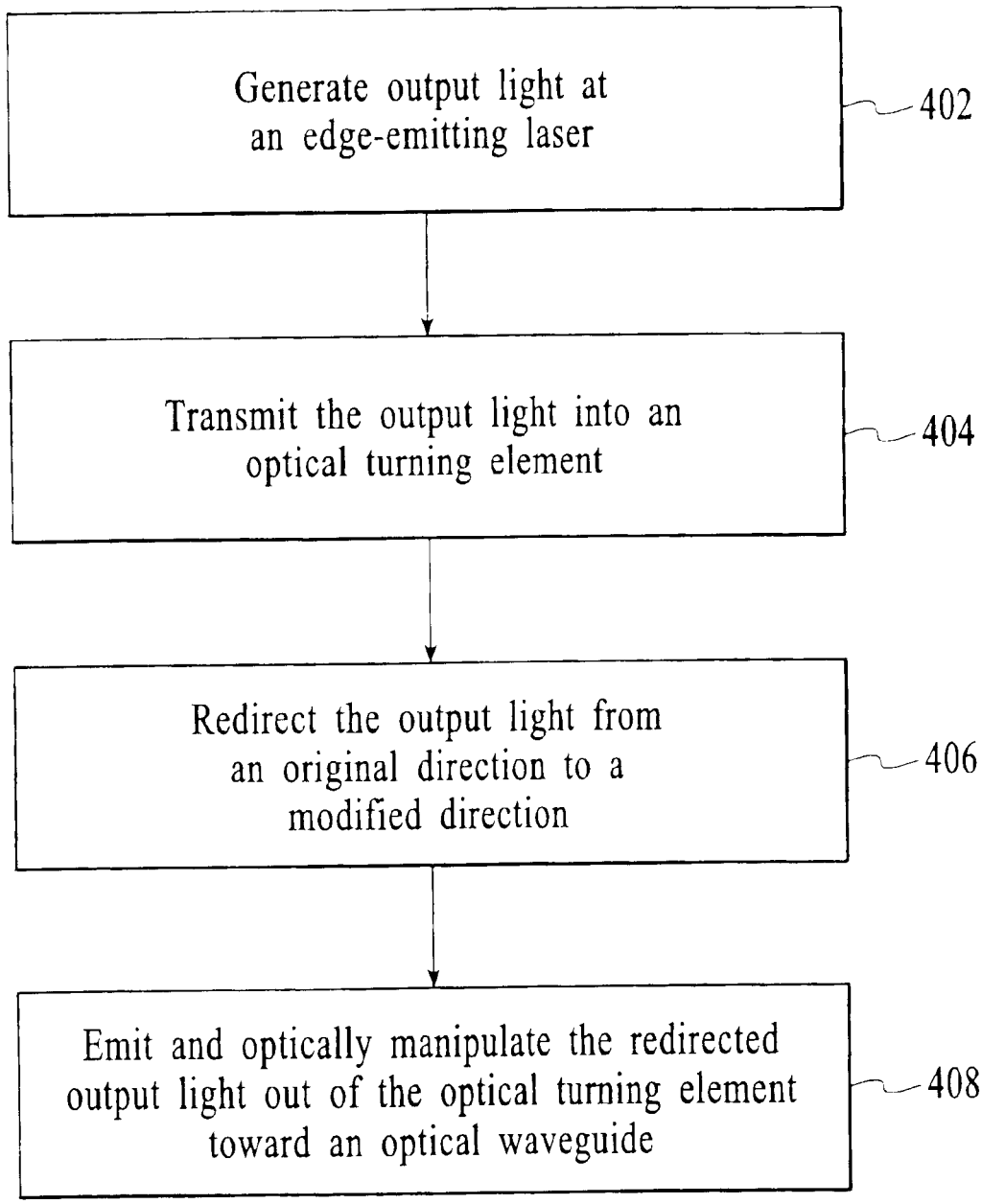
FIG. 4 is a process flow diagram of a method of coupling output light from an edge-emitting laser to an optical waveguide in accordance with an exemplary embodiment of the present invention.

A method for coupling output light from an edge-emitting laser to an optical waveguide in accordance with an exemplary embodiment is described with reference to FIG. 4. At step 402, the output light is generated at the edge-emitting laser such that the output light is emitted from an edge of the laser in an original direction. Next, at step 404, the output light is transmitted into an optical turning element through a receiving surface of the element. At step 404, the output light is redirected from the original direction to a modified direction, which may be approximately perpendicular to the original direction. In the exemplary embodiment, the output light is redirected by both refracting and reflecting the output light using two surfaces of the optical turning element. Next, at step 406, the redirected output light is emitted out of the optical turning element through a focusing surface of the optical turning element toward the optical waveguide, which may be an optical fiber. During step 406, the redirected output light is also optically manipulated into the optical waveguide by a lens formed on the focusing surface. In other embodiments, additional output lights from additional edge-emitting lasers may be coupled to additional optical waveguides in the same manner using the same optical turning element. In these embodiments, the optical turning element includes additional lenses formed on the focusing surface to optically manipulate the additional output lights that are emitted out of the optical turning element.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An apparatus for coupling output light from a light source to a waveguide comprising:

a substrate having an upper surface;

an optical element positioned on the upper surface of the substrate, the optical element having a first surface to receive the output light from the light source such that the output light is transmitted into the optical element, the optical element further having a second surface to internally reflect the output light to redirect the output light from an original direction to a modified direction toward the waveguide, the optical element further having a third surface with a lens formed on the third surface to optically manipulate the output light propagating along the modified direction to transmit the output light to the waveguide, the third surface being substantially parallel to the upper surface of the substrate.

2. The apparatus of claim 1 wherein the second surface is angled with respect to a lateral axis parallel to the original direction such that the output light is redirected by approximately ninety degrees after being transmitted through the first surface and reflected off the second surface.

3. The apparatus of claim 2 wherein the first surface is angled with respect to the lateral axis such that the output light is redirected by approximately ninety degrees after being refracted by the first surface and reflected off the second surface.

4. The apparatus of claim 3 wherein the first and second surfaces are relatively angled such that the first and second surfaces form an angle that is approximately seventy degrees.

5. The apparatus of claim 1 further comprising an edge-emitting laser that serves as the light source to emit the output light along the original direction, the original direction being substantially parallel to the upper surface of the substrate.

6. The apparatus of claim 1 wherein the lens of the third surface is configured to optically manipulate the output light so that the output light propagate off-axis from the lens.

7. The apparatus of claim 1 wherein the third surface includes a plurality of lenses formed on the third surface to optically manipulate output lights from corresponding light sources.

8. The apparatus of claim 1 wherein the optical element is made of a transparent material selected from a group of silicon, plastic, glass, sapphire, III–V material and II–VI material.

9. The apparatus of claim 1 wherein the optical element includes a fourth surface that is substantially parallel to the third surface, the fourth surface being on the upper surface of the substrate.

10. An apparatus comprising:

a substrate;

an edge-emitting light source positioned on the substrate, the edge-emitting light source being configured to generate an output light along an original direction; and an optical element positioned on the substrate to receive the output light from the edge-emitting light source, the optical element having a first surface to receive the output light such that the output light is transmitted into the optical element, the optical element further having a second surface to internally reflect the output light to redirect the output light from the original direction to a modified direction, the optical element further having a third surface with a lens formed on the third surface to optically manipulate the output light as the output light is transmitted through the third surface.

11. The apparatus of claim 10 wherein the second surface is angled with respect to a lateral axis parallel to the original direction such that the output light is redirected by approximately ninety degrees after being transmitted through the first surface and reflected off the second surface.

12. The apparatus of claim 11 wherein the first surface is angled with respect to the lateral axis such that the output light is redirected by approximately ninety degrees after being refracted by the first surface and reflected off the second surface.

13. The apparatus of claim 12 wherein the first and second surfaces are relatively angled such that the first and second surfaces form an angle that is approximately seventy degrees.

14. The apparatus of claim 10 further comprising an array of edge-emitting light sources.

15. The apparatus of claim 14 wherein the third surface of the optical element includes a plurality of lenses formed on the third surface.

16. The apparatus of claim 10 wherein the lens of the third surface is configured to optically manipulate the output light so that the output light propagate off-axis from the lens.

17. The apparatus of claim 10 wherein the optical element is made of a transparent material selected from a group consisting of silicon, plastic, glass, sapphire, III–V material and II–VI material.

18. The apparatus of claim 10 wherein the original direction and the third surface of the optical element are both substantially parallel to an upper surface of the substrate.

19. A method for coupling output light from a light source to a waveguide comprising:

transmitting the output light from the light source propagating along an original direction into an optical element, the original direction being substantially parallel to an upper surface of a substrate on which the light source and the optical element are positioned;

redirecting the output light from the original direction to a modified direction within the optical element; and omitting the output light propagating along the modified direction out of the optical element toward the waveguide, including optically manipulating the output light into the waveguide.

20. The method of claim 19 further comprising generating the output light at the light source, wherein the light source includes an edge-emitting laser.

21. The method of claim 19 wherein the redirecting of the output light includes reflecting the output light propagating within the optical element off a reflective surface of the optical element to the modified direction.

22. The method of claim 21 wherein the redirecting of the output light includes refracting the output light at a refractive surface of the optical element such that the output light is redirected by approximately ninety degrees after being refracted and reflected by the optical element.

23. The method of claim 19 wherein the optically manipulating of the output light includes optically manipulating the output light using a lens formed on a surface of the optical element.

24. The method of claim 23 wherein the optical manipulating of the output light includes optically manipulating the output light so that the output light propagates off-axis from the lens.

25. The method of claim 19 further comprising:

transmitting other output lights from other light sources propagating along the original direction into the optical element;

redirecting the other output lights from the original direction to the modified direction; and emitting the other output lights propagating along the modified direction out of the optical element toward other waveguides, including optically manipulating the other output lights into the other waveguides.

* * * * *